May 27, 1969  G. MARCHAL ET AL  3,446,431

CENTRIFUGAL MACHINES

Filed Sept. 13, 1966  Sheet 1 of 3

INVENTORS
Germain Marchal
Max Tridon

BY
Alexander Mizell

ATTORNEY

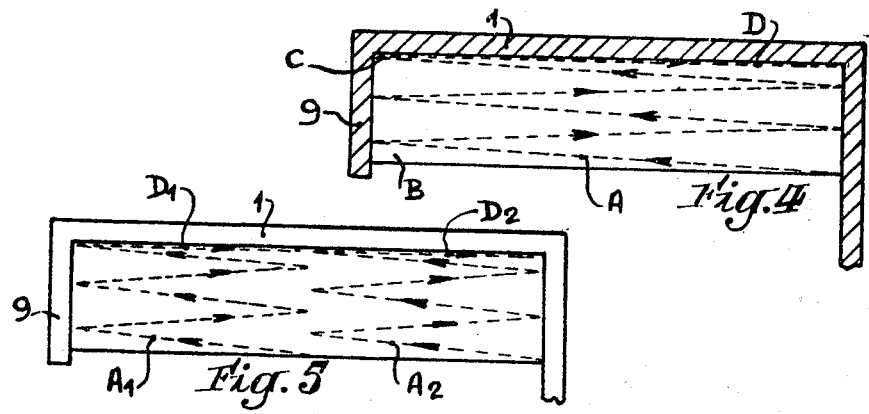
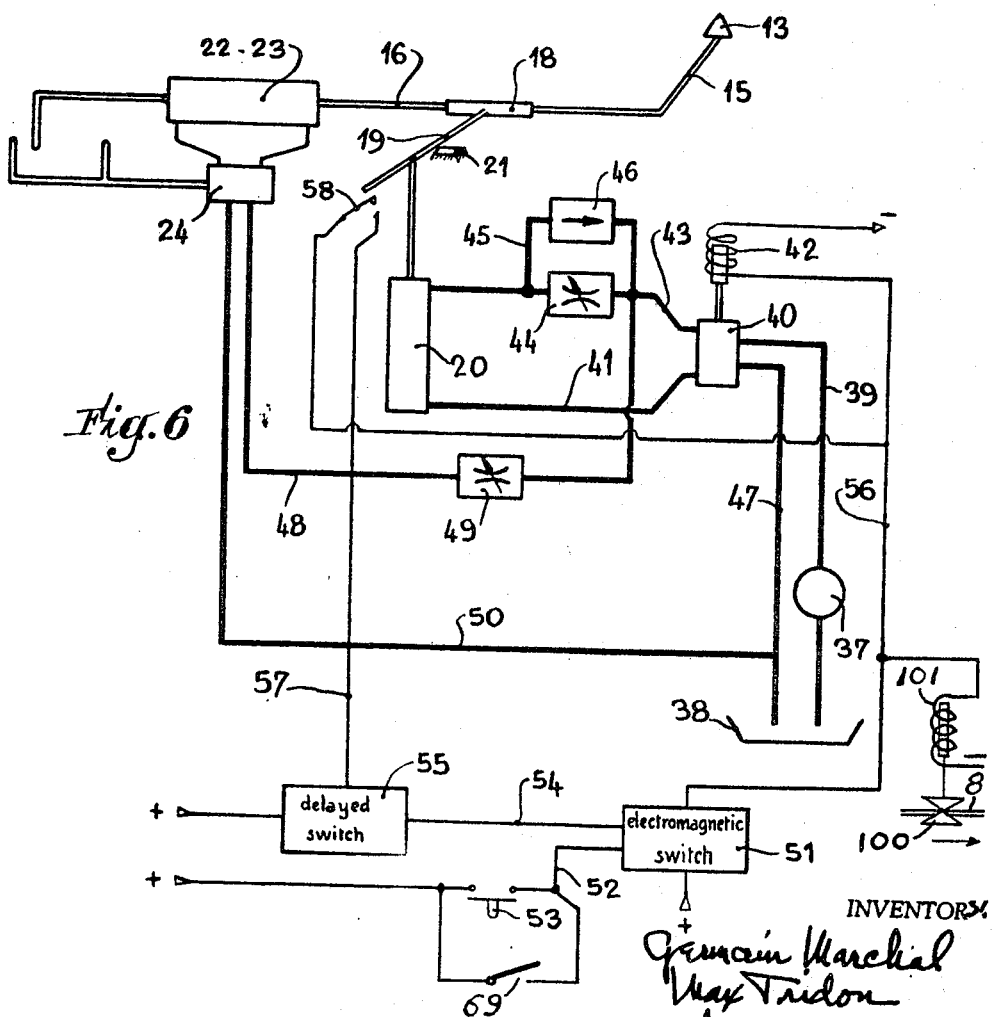

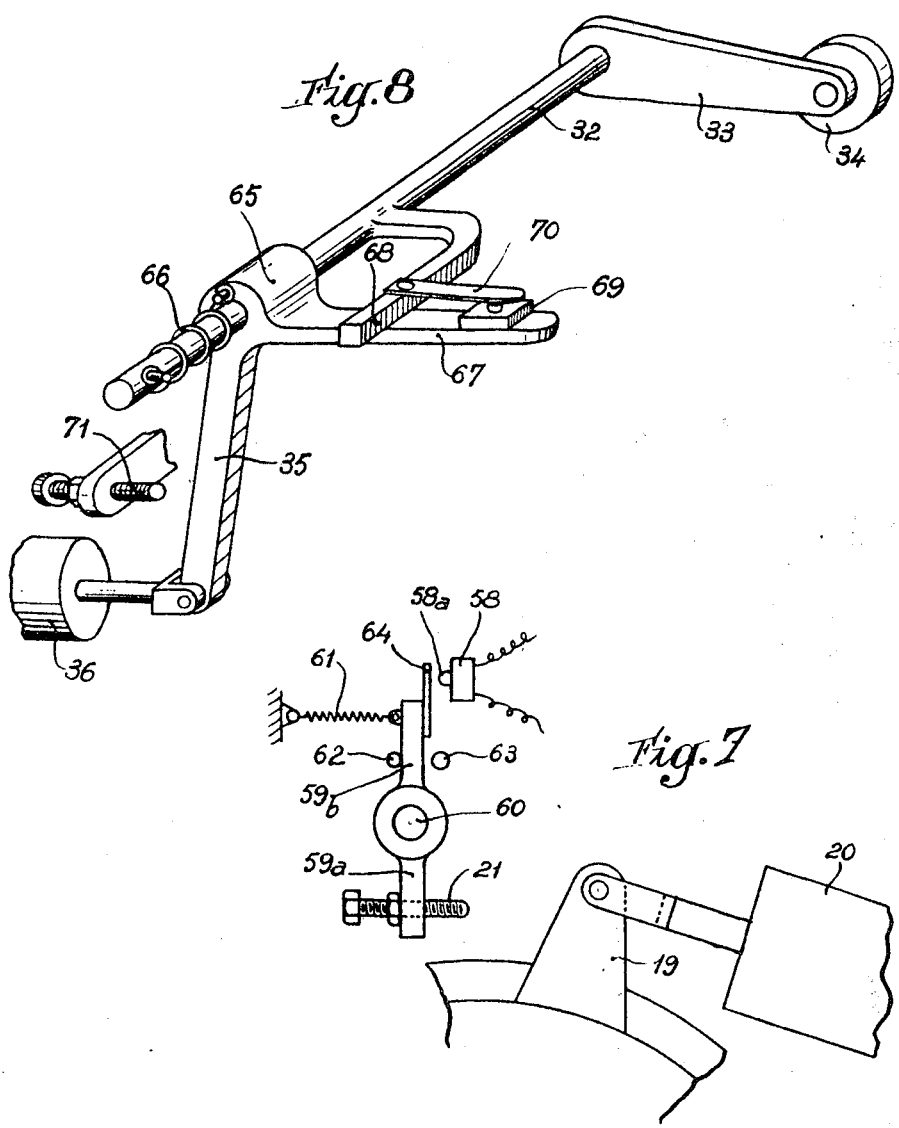

United States Patent Office 3,446,431
Patented May 27, 1969

3,446,431
CENTRIFUGAL MACHINES
Germain Marchal, Ecully, and Max Tridon, Neuville-sur-Saone, France, assignors to Ateliers Robatel & Mulatier, Lyon, Rhone, France, a French joint-stock company
Filed Sept. 13, 1966, Ser. No. 579,106
Claims priority, application France, May 5, 1966, 47,239
Int. Cl. B04b 11/08
U.S. Cl. 233—19
4 Claims

ABSTRACT OF THE DISCLOSURE

The centrifugal machine comprises a hollow member within a casing and rotatable therein, the member having an open end and a cylindrical inner periphery; with means to supply a liquid containing suspended solids into the rotating member to cause the solids to separate from said liquid under the action of centrifugal force and to form a solid layer on the inner periphery of the rotating member; with scraper means within the rotating member to scrape the solid layer from the inner periphery thereof, the scraper means being supported through the open end of the rotating member so as to be movable radially and longitudinally with respect to the axis of rotation of the rotating member; with actuating means to impart to the scraper means a first reciprocating motion parallel to the axis of rotation of the rotating member and at the same time an advancing motion in a substantially radial direction with respect to the axis towards the inner periphery of the rotating member, the advancing motion being effected at such a slow speed with respect to the reciprocating motion that the scraper means follows a zig-zag path with respect to the layer while scraping the latter from the periphery; with means to collect and to evacuate from the rotating member the solids scraped therefrom; and with detecting means responsive to the thickness of the solid layer formed on the inner periphery of the rotating member, the detecting means becoming operative when the layer has reached a predetermined thickness to stop supply of liquid with suspended solids into the rotating member and to initiate operation of the actuating means.

This invention relates to centrifugal machines comprising a scraper adapted to remove the solid layer formed on the inner wall of the rotating member, i.e. of the perforated basket of a strainer separator or of the plain drum of a density separator.

The invention more particularly concerns centrifugal machines of the kind above referred to wherein the axis of rotation of the basket or drum is substantially horizontal. In such machines the suspension to be treated is progressively poured into the rotating basket or drum wherein it is almost immediately submitted to the action of centrifugal force. In the case of a strainer separator the liquid phase of the suspension permeates through the filtering wall of the basket while solids are retained and form thereon a layer of increasing thickness. In the case of a density separator, solids separate from the liquid phase and also form a layer on the inner periphery of the rotating drum while the liquid phase appears as an inner ring which is discharged either by overflowing the inner end flange of the drum or by means of a scoop or suction tube. In both cases when the solid layer has reached a given thickness, the supply of suspension to be treated is discontinued, the layer is washed, if desired, and it is finally removed from the basket or drum. This is generally effected by means of a scraper which operates on the solid layer more or less as the non-rotating tool of a boring machine on the hollow blank to be bored. The pieces, chips or particles detached by the scraper are collected in a trough disposed below the latter and they are discharged from the machine in any appropriate manner, as for instance by means of an Archimedes screw or merely by gravity.

It is an object of the present invention to provide a centrifugal separator having improved means for the supply of the suspension to be treated and for the scraping of the solid layer formed on the inner periphery of the rotating basket or drum.

Another object of the present invention is to provide a scraping device for a centrifugal separator of the kind above referred to, wherein the scraper is supported by an arm carried by a longitudinal shaft substantially spaced from the rotational axis of the machine, means being provided to simultaneously impart to this shaft an axial reciprocating motion owing to which the scraper is displaced to and from on the solid layer in a direction parallel to the axis of the machine, and a slow angular motion which causes the scraper to progressively advance into the layer. Owing to this combination of elementary motions, the cutting tip or edge of the scraper follows with respect to the thickness of the layer a zig-zag path comprising a succession of straight lines alternately inclined in one direction and in the other with respect to the axis of the machine. It will be grasped that in order to wholly remove the solid layer, the last straight path of the scraper should be longitudinal, which is easily obtained by stopping the angular motion of the scraper carrying shaft.

A further object of the present invention is a centrifugal machine of the kind above referred to, wherein the hub of the rotating basket or drum carries a disk or flange member substantially disposed in the transverse plane of the outer edge of the said basket or drum, or at a small distance from this plane inwardly with respect to the basket or drum, in such manner that any liquid or suspension flowing along the hub may be automatically thrown radially by centrifugal force and thus prevented from escaping outwardly through the open end of the basket or drum.

Still another object of the present invention is a scraper having two lateral flanges adapted to form guides for the particles, chips or pieces detached from the solid layer and to direct same towards the collecting trough.

In the annexed drawings:

FIGS. 4 and 5 are explanatory diagrams illustrating the operation of the scraper.

FIG. 6 is a general diagram of the hydraulic and electric circuits.

FIGS. 7 and 8 diagrammatically show possible embodiments of the switches or contacts associated with the scraper advancing gearing and with the layer feeling device.

Figure 1:
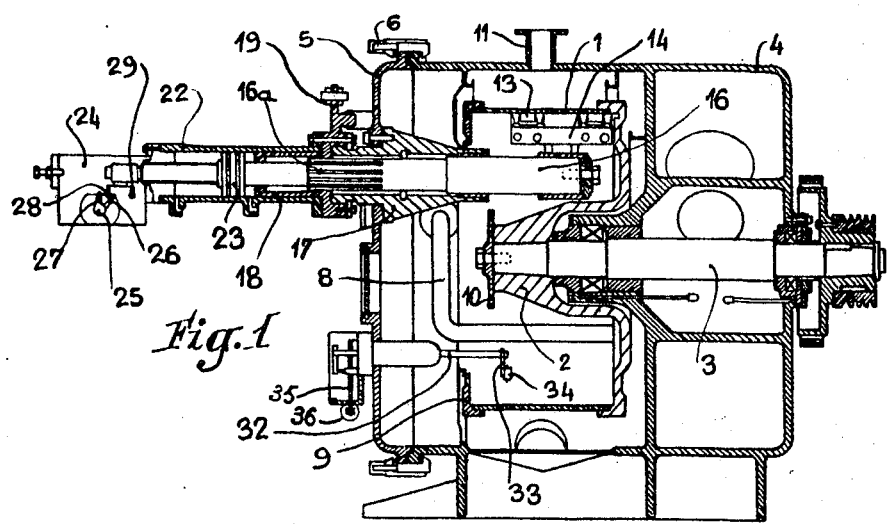
FIG. 1 is a longitudinal vertical section through a centrifugal density separator according to the present invention.
Figure 2:
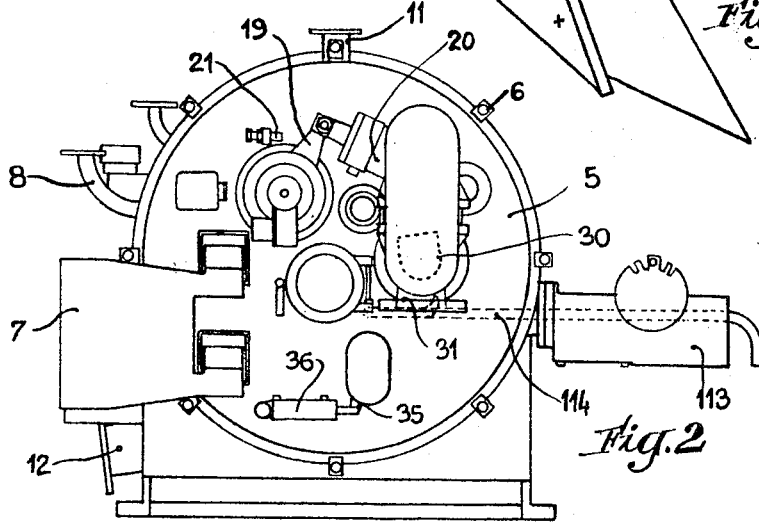
FIG. 2 is an end view thereof.

Referring to FIGS. 1 and 2, the centrifugal density separator illustrated comprises a cylindrical rotating drum 1 (FIG. 1) carried by an inner axial hub 2 which is keyed on the protruding end of a horizontal shaft 3 rotatably supported by the fixed outer casing 4 of the machine. This casing surrounds the rotating drum 1 and its front end is closed by a hinged cover 5 clamped in position by appropriate clamping members 6. As indicated in FIG. 2 cover 5 is not directly carried by casing 4, but by the end of an intermediate arm 7 which is in turn hinged to the said casing 4. Cover 5 may thus be applied against or disengaged from the end of casing 4 by a mere movement of translation and if an intermediate seal (not illustrated) is disposed between the facing surfaces, it may be compressed regularly, i.e. with a substantially uniform pressure, which would not be the case should cover 5 be directly hinged to casing 4.

The outer casing 4 supports the feed conduit 8 for the suspension to be treated, this conduit opening close to the end wall of the rotating drum 1, near the hub 2 thereof. It will be understood that the suspension is thus rapidly set into rotation and applied against the inner periphery of the drum by centrifugal force while being retained by an inner flange 9 provided at the open end thereof. The free end of the hub 2 of drum 1, i.e. its end nearest to the open end thereof, carries a transverse disk 10 of substantially larger diameter than the hub, the general plane of this disk being situated at a small distance from the plane of the open end of drum 1, inwardly with respect to said drum 1. The liquid or suspension which may flow along the periphery of hub 2 towards the open end of drum 1 is thus thrown radially by disk 10 without any possibility of escaping through the said open end.

The outer casing 4 further carries an upper outlet 11 through which gases may exhaust freely, if required. This outlet also permits of operating at a pressure different from atmospheric pressure, if desired.

Casing 4 also supports a number of other members such as a lower draining outlet 12 (FIG. 2) and an outer mechanism 113 for the actuation of an inner suction tube or scoop 114 by means of which liquid may be extracted in the conventional manner from the rotating drum 1, when required. Since such as device is well-known in the art and forms no part of the present invention, it has not been detailed in the drawings.

Figure 3:
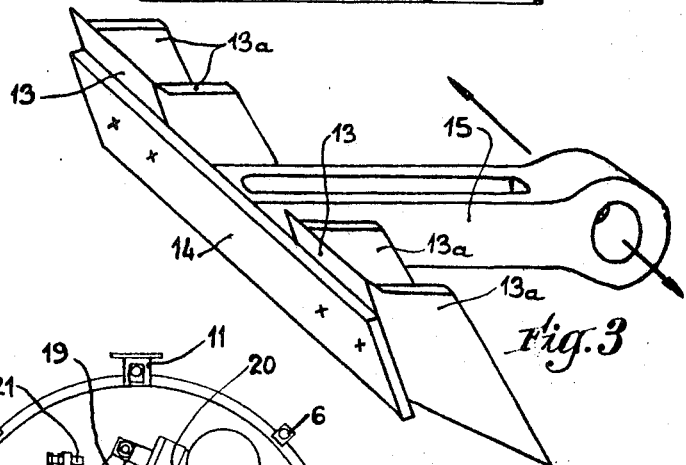
FIG. 3 is an isometric view of the scraping device.

The scraping device adapted to remove the solid layer from the inner periphery of drum 1 comprises two U-shaped elements (FIG. 3) each being formed of a blade 13 provided with two lateral walks 13a which terminate short of the cutting edge of the blade in order not to engage the solid layer to be scraped. Elements 13-13a are secured to the ends of a longitudinal bar 14 which is itself carried by an arm 15 radially secured to the end of a longitudinal shaft 16 (FIG. 1). The latter is slidably and rotatably carried by an elongated bearing 17 suported by cover 5. The outer end of bearing 17 rotatably supports a sleeve 18 having inwardly directed teeth which slidably engage a fluted portion 16a of shaft 16 in order to positively rotate the latter while permitting same to slide freely in the longitudinal direction. The outer sleeve 18 is formed with a radial arm 19 (FIGS. 1 and 2) to the end of which is pivotally attached the actuating rod of a hydraulic ram 20 whose cylinder is pivoted to the outer side of cover 5. It will be grasped that when ram 20 is operated, it oscillates arm 19, sleeve 18, shaft 16, arm 15, bar 14 and scrapers 13-13a. This angular movement of arm 15 moves the scrapers towards the inner periphery of the rotating drum 1 or away from same. An adjustable abutment 21 (FIG. 2) limits the angular stroke of arm 19 to eliminate any possibility of physical contact between the scraping blades and the inner periphery of drum 1. An electric switch, not illustrated in FIGS. 1 and 2, is associated with abutment 21.

Shaft 16 is displaced axially be means of an hydraulic ram disposed in line therewith. As shown in FIG. 1 this ram comprises a cylinder 22 secured to the outer sleeve 18 and a piston 23 rigidly mounted on the said shaft within cylinder 22. A control valve 24 associated with ram 22-23 is carried by the outer end of cylinder 22, this valve having an actuating shaft 25, transversely disposed with respect to shaft 16 and which carries a pair of radial actuating fingers 26 and 27 adapted for cooperation with two corresponding fingers 28 and 29 secured to the end portion of shaft 16 which protrudes beyond cylinder 22. It will be noted that fingers 26 and 27 are spaced axially on shaft 25, fingers 28 and 29 being disposed correspondingly in order that finger 28 only acts on finger 26 and finger 29 on finger 27. It will be grasped that when oil under pressure is supplied to valve 24, shaft 16 will be automatically reciprocated axially since at each end of its stroke it will actuate valve 24 which will reverse its motion. Of course a snap-acting mechanism may be provided in order to avoid the possibility that the control valve 24 may remain at an intermediate position.

The solid material detached by scrapers 13 is collected in the conventional manner by an inner trough 30 (FIG. 2) with which is associated an Archimedes screw device which conveys this material towards an outlet 31, the trough and the screw conveyor being carried by cover 5. It should be noted in this respect that the scraping units 13-13a (FIG. 3) form guiding channels for the particles or pieces of solid material and thus avoid any loss of same.

Cover 5 further supports a feeler device comprising a longitudinal shaft 32 (FIG. 1) which carries at its inner end an arm 33 provided at its free end with a feeling roller 34. On the outer end of shaft 32 is loosely mounted another arm 35 resiliently coupled with the said shaft by a spring (not illustrated) which maintains arm 35 against an abutment carried by shaft 32. Arm 35 is actuated by a hydraulic ram 36 (FIG. 2) pivotally attached to cover 5. When ram 36 is operated, roller 34 is displaced radially towards the inner periphery of drum 1. When this roller engages the solid layer formed against this periphery, its movement stops, but since the shaft 32 is only coupled with arm 35 by spring means, the said arm may continue its angular displacement under the action of ram 36. This relative movement of arm 35 with respect to shaft 32 actuates an appropriate micro-contact (not illustrated in FIGS. 1 and 2) carried either by arm 35 or by shaft 32, and the actuation of this micro-contact with respect to the angular position of arm 35 indicates the thickness of the solid layer. A possible embodiment of a feeling device embodying such a switch will be described with reference to FIG. 8.

When the solid layer has reached a pre-determined thickness, which in actual practice corresponds substantially to the height of the inner flange 9, the supply of suspension to be treated is discontinued, the layer is washed, if desired and the scarping device is set in operation. For this purpose oil under pressure is supplied to ram 22 through control valve 24 and to ram 20 through an adjustable orifice which ensures a quite slow displacement of ram 20. Scrapers 13 are thus slowly advanced towards the inner periphery of drum 1 while being reciprocated axially under the action of ram 22-23, and they progressively scrape the solid layer.

Supposing that the scraping device only comprises a single blade, the latter would follow the zig-zag path A illustrated in FIG. 4. It would substantially remove the whole solid layer apart from a small triangular-shaped residue. In order to eliminate same, it would be sufficient to stop the radial advancing movement of the single scraping blade and to let same continue its reciprocating longitudinal motion, as illustrated at D.

Since the scraping device actually comprises two blades, the longitudinal stroke should be reduced by an amount substantially equal to the distance apart of the blades. Each blade then follows its own zig-zag path A, respectively $A_1$, $A_2$ (FIG. 5) followed by a longitudinal stroke $D_1, D_2$.

The composite motion of shaft 16 permits the realization of an automatic control of the scraping operation which is particularly simple, safe and efficient. FIG. 6 shows the hydraulic and electric circuits provided for this purpose, the thick lines corresponding to the hydraulic conduits and the fine lines to the electric wires. This figure further illustrates in diagrammatic form the reciprocating ram 22-23 with its control valve 24, the scraper carrying shaft 16 with its arm 15 supporting a single scraping blade 13. The actuating gearing between shaft 16 and valve 24 has been illustrated under a highly simplified form which is self-explanatory and needs no detailed description. Shaft 16 supports the outer sleeve 18 with its arm 19 actuated by ram 20, the angular stroke being limited by abutment 21.

A pump 37 sucks oil from a sump 38 and forces same into a conduit 39 connected to an electromagnetic valve 40 which controls ram 20. Valve 40 is biased towards the position for which oil under pressure flows though a conduit 41 into ram 20 in such a manner that the scraper 13 is brought to its inoperative position farthest from the inner periphery of the drum (arm 19 being at its maximum distance from abutment 21), the stroke of ram 20 being of course limited by its inner piston itself. When the actuating solenoid 42 is energized, oil under pressure flows through another conduit 43 and the motion of ram 20 is reversed. Conduit 43 comprises an adjustable throttling orifice 44 by-passed by a conduit 45 having a non-return valve 46 which is so disposed as to permit oil to flow back freely from ram 20 towards valve 40, but to prevent it from flowing in the reverse direction. It will be understood that with such an arrangement oil under pressure is supplied to ram 20 through conduit 43 at a very reduced rate and that therefore the advancing movement of scraper 13 is quite slow.

The oil from valve 40 is returned to sump 38 through a conduit 47.

The control valve 24 associated to ram 22–23 receives oil under pressure through a conduit 48 from the above-mentioned conduit 43, upstream with respect to the adjustable throttling device 44. Conduit 48 also comprises a throttling device 49, but the latter is so arranged as to permit a flow rate substantially greater than device 44. Oil from valve 24 is returned to sump 38 through a conduit 50.

In the example shown the electric circuits operate with D.C. though of course A.C. could be used with some obvious modifications.

The electric circuitry comprises a main electromagnetic switch 51, which may be closed by momentarily energizing a wire 52 by means of a push-button 53 in the conventional manner, opening of the switch being effected by means of another wire 54 controlled by a delayed switch 55. The main switch 51 energizes directly the solenoid 42 of valve 40, while the delayed switch 55 is adapted to momentarily open the circuit of wire 54 when it receives a pulse through a wire 57 from the micro-contact 58 associated with arm 19, this micro-contact being actuated when arm 19 engages abutment 21. Micro-contact 58 receives current from the above-mentioned wire 56, i.e. when the main switch 51 is closed.

During normal operation of the centrifugal separator the main switch 51 is open, solenoid 42 is unenergized and valve 40 is therefore at the position for which oil under pressure is directed towards conduit 41. Scraper 13 is therefore at its inoperative position farthest from the inner periphery of drum 1.

In order to initiate a scraping cycle the operator actuates push-button 53. The main switch 51 therefore closes and it remains closed under the action of a conventional retaining circuit comprising wire 54. Solenoid 42 is energized and it actuates valve 40. Oil under pressure now flows through conduit 43 at a quite reduced rate owing to the presence of the adjustable throttling device 44, non-return valve 46 being closed. Scraper 13 therefore advances very slowly towards the inner periphery of the rotating drum under the action of ram 20. At the same time oil under pressure flows through conduit 48 and throttling device 49 towards the control valve 24 of ram 22–23 which reciprocates shaft 16 and scraper 13.

At the end of the advancing stroke of scraper 13 (i.e. of its stroke towards the inner periphery of the drum) the micro-contact 58 is actuated by arm 19 and the delayed switch 55 receives an energizing pulse. Owing to its delayed character switch 55 only operates after a predetermined time (which is preferably adjustable) and during this time ram 22–23 continues reciprocating scraper 13 the advance of which is now stopped by abutment 21. This period of the operating cycle corresponds to the longitudinal strokes such as D, $D_1$, and $D_2$ (FIGS. 4 and 5).

When the delayed switch 55 operates, it opens the circuit of wire 54, thus causing the main switch 51 to open. Solenoid 42 is deenergized and valve 40 directs the oil under pressure into conduit 41. Scraper 13 is thus returned to its inoperative position, farthest from the inner periphery of the rotating drum, this movement being effected rapidly, since valve 46 permits the oil from ram 20 to flow back freely towards valve 40 and conduit 47. At the same time ram 22–23 is rendered inoperative, conduit 48 being now connected with the oil return conduit 47. It will be observed that micro-contact 58 is now open and that therefore the circuit of wire 54 is closed, whereby the main switch 51 is again ready to be closed by push-button 53.

It will be obvious that the push-button 53, or any equivalent electric contact, could be actuated automatically, if desired. For instance, if the successive operative cycles of the centrifugal machine are of substantially constant duration, push-button 53 could be actuated by a chronometric mechanism at quite regular intervals. It would also be possible to associate push-button 53 with a feeler device comprising the feeling roller 34 (FIGS. 1 and 2). In such a case the stroke of the ram 36 (FIG. 2) which actuates roller 34 could be limited (as for instance by an appropriate abutment) to such an extent that the said roller would only contact the solid layer when same had reached the prescribed thickness.

In such a wholly automatic operation the supply of suspension to be treated should be automatically stopped when the scraping device begins operating. This may easily be obtained by means of an electromagnetically operated valve 100 (FIG. 6) adapted to be normally open, the solenoid 101 of this valve being energized by the main switch 51.

In the preceding description reference has been made to switches or contacts associated to the abutment of the scraper advancing mechanism 21 and to the arm 35 of the feeling device. FIGS. 7 and 8 show possible embodiments of such switch arrangements.

In the example of FIG. 7 the adjustable limiting abutment 21 is in the form of a screw, as in FIG. 1, but it is here carired by the lower arm 59a of a two-armed lever 59a–59b pivoted at 60 on the cover of the machine (cover 5 of FIGS. 1 and 2), the upper arm 59b of the said lever being normally maintained by a spring 61 against a first stop 62. When the scraper reaches the end of its advancing stroke, arm 19 engages screw 21 and causes lever 59a–59b to rotate clockwise in FIG. 7 against the action of spring 61, whereby the upper arm 59b comes against a second stop 63 which thus limits the angular movement of arm 19. Arm 59b carries a resilient finger 64 adapted to actuated the button 58a of the micro-contact or micro-switch 58 just before arm 59b engages stop 63.

In the feeler device of FIG. 8, the actuating arm 35 which receives the action of ram 36 has a hub 65 loosely mounted on the outer end of the shaft 32 which carries the arm 33 supporting the feeling roller 34. Hub 65 is resiliently coupled with shaft 32 by means of a torsional spring 66 and it is formed with a lateral lug 67 adapted to cooperate with the bent end of an arm 68 secured to shaft 32 as for instance by welding. Lug 67 supports a micro-switch 69 the button of which receives the action of a resilient finger 70 fixed to arm 68. When arm 36 is actuated to lower roller 34 against the solid layer formed on the inner periphery of the rotating drum 1 (see FIG. 1), lug 67 is at first maintained against arm 68 by the reaction of spring 66. But as soon as roller 34 engages the said layer, its downward advancing movement is stopped and therefore hub 65 rotates on shaft 32 against the reaction of spring 66. Switch 69 is therefore lowered with respect to finger 70 and it opens or closes, as the case may be.

FIG. 8 further shows an adjustable abutment 71 by means of which the angular stroke of arm 35 may be limited to such a position that switch 69 may only be actuated when the solid layer has reached a pre-determined thickness.

We claim:

1. A centrifugal machine comprising a fixed casing; a hollow member mounted within said casing to rotate therein about an axis of rotation, said member having an open end and a substantially cylindrical inner periphery concentric to said axis; means to supply a liquid containing suspended solids into said rotating member to cause said solids to separate from said liquid under the action of centrifugal force and to form a solid layer on the inner periphery of said rotating member; scraper means within said rotating member to scrape the solid layer from the inner periphery thereof, said scraper means being supported through the open end of said rotating member so as to be movable radially and longitudinally with respect to the axis of rotation of said rotating member; actuating means to impart to said scraper means a first reciprocating motion parallel to the axis of rotation of said rotating member and at the same time an advancing motion in a substantially radial direction with respect to said axis towards the inner periphery of said rotating member, said advancing motion being effected at such a slow speed with respect to said reciprocating motion that said scrape means follows a zig-zag path with respect to said layer while scraping the latter from said periphery; means to collect and to evacuate from said rotating member the solids scraped therefrom; and detecting means responsive to the thickness of the solid layer formed on the inner periphery of said rotating member, said detecting means becoming operative when said layer has reached a predetermined thickness to stop supply of liquid with suspended solids into said rotating member and to initiate operation of said actuating means.

2. In a machine as set forth in claim 1, said detecting means including a shaft entering and journaled in the casing, an arm on the inner end of said shaft carrying at its free end a feeling roller, a second arm on the outer end of said shaft resiliently coupled to said shaft to maintain the second arm against an abutment carried by said shaft; an hydraulic ram pivotally connecting said casing and shaft adapted when actuated to displace said roller radially towards the inner periphery of said hollow member, whereby when the roller engages the layer on the inner periphery of the hollow member its movement stops while the second arm continues its angular displacement under action of said ram to actuate means to indicate the thickness of the solid layer.

3. In a machine as set forth in claim 1, means for automatically controlling the scraping operation, comprising an hydraulic circuit and an electric circuit; said hydraulic circuit including a first hydraulic ram, controlled by a reversing electromagnetic valve for effecting said substantially radial slow advancing motion of said scraper means; an oil pump; a pump for forcing oil from the sump into the electromagnetic valve; and a second hydraulic ram controlled by a second reversing valve actuated by said second hydraulic ram itself at the end of each of its strokes for effecting said reciprocating motion of said scraper means; said second valve receiving oil from said electromagnetic valve when same is biased into position in which said scraper means are advanced towards the cylindrical inner periphery of said hollow member.

4. In a machine as set forth in claim 3, said electric circuit including a main switch which may be closed by momentarily energizing a wire by means of a push button, the opening of the switch being effected by means of a second wire controlled by a delayed switch; said main switch energizing directly the electromagnetic valve while the delayed switch momentarly opens the circuit of the first wire when it receives a pulse through a third wire from a micro-contact associated with radial advancing movement of the scraper means and receiving current when the main switch is closed.

References Cited

UNITED STATES PATENTS

| 3,141,846 | 7/1964 | Laven | 233—19 |
| 2,078,273 | 4/1937 | Pecker | 210—375 |
| 2,172,320 | 9/1939 | Jones | 210—376 XR |
| 2,894,634 | 7/1959 | Lepoutre et al. | 210—376 XR |
| 3,338,418 | 8/1967 | Koslowski et al. | 210—375 |

OTHER REFERENCES

German printed application, 1,154,401, September 1963.
Chemical & Eng'r'g of Jan. 26, 1959, p. 54, Sharples.

HENRY T. KLINKSIEK, *Primary Examiner.*

U.S. Cl. X.R.

210—86, 106, 375; 233—22